US012719372B2

(12) United States Patent
Ying et al.

(10) Patent No.: US 12,719,372 B2
(45) Date of Patent: Aug. 25, 2026

(54) IMPLEMENTATION METHOD OF USING AUXILIARY WINDING OF TRANSFORMER TO SUPPLY POWER TO PRIMARY CONTROLLER

(71) Applicant: Diodes Incorporated, Plano, TX (US)

(72) Inventors: Zheng Ying, Shanghai (CN); Feng Wang, Shanghai (CN); Bo Chen, Shanghai (CN)

(73) Assignee: DIODES INCORPORATED, Plano, TX (US)

( * ) Notice: Subject to any disclaimer, the term of this patent is extended or adjusted under 35 U.S.C. 154(b) by 195 days.

(21) Appl. No.: 18/778,699

(22) Filed: Jul. 19, 2024

(65) Prior Publication Data

US 2024/0372477 A1 Nov. 7, 2024

Related U.S. Application Data

(63) Continuation of application No. PCT/CN2023/100603, filed on Jun. 16, 2023.

(30) Foreign Application Priority Data

Sep. 29, 2022 (CN) ......................... 202211200833.3

(51) Int. Cl.
*H02M 3/335* (2006.01)
*H02M 1/00* (2006.01)

(52) U.S. Cl.
CPC ......... *H02M 3/335* (2013.01); *H02M 1/0058* (2021.05); *H02M 1/0095* (2021.05)

(58) Field of Classification Search
CPC ... H02M 3/335; H02M 1/0058; H02M 1/0095
See application file for complete search history.

(56) References Cited

U.S. PATENT DOCUMENTS

| | | | | |
|---|---|---|---|---|
| 10,784,789 | B1 * | 9/2020 | Nasir | H02M 1/08 |
| 2024/0113631 | A1 * | 4/2024 | Ying | H02M 1/0009 |
| 2024/0128881 | A1 * | 4/2024 | Yu | H02M 3/33523 |

* cited by examiner

*Primary Examiner* — Adolf D Berhane
(74) *Attorney, Agent, or Firm* — Kilpatrick Townsend & Stockton LLP

(57) ABSTRACT

A circuit for supplying power to a switching power supply control circuit based on an auxiliary winding includes: an auxiliary winding, a switching transistor, a low dropout voltage regulator (LDO), a first diode, a second diode, a forward energy storage capacitor, and a flyback energy storage capacitor, where the auxiliary winding, the flyback energy storage capacitor, and the switching transistor form a flyback energy storage loop to charge the flyback energy storage capacitor, and the auxiliary winding, the flyback energy storage capacitor, and the switching transistor form a flyback energy storage loop to charge the flyback energy storage capacitor. In a forward state, if the voltage of the forward energy storage capacitor is less than the voltage at an output terminal of the LDO, the flyback energy storage capacitor supplies power, or if the voltage of the forward energy storage capacitor is greater, the forward energy storage capacitor supplies power.

10 Claims, 2 Drawing Sheets

IMPLEMENTATION METHOD OF USING AUXILIARY WINDING OF TRANSFORMER TO SUPPLY POWER TO PRIMARY CONTROLLER

CROSS-REFERENCES TO RELATED APPLICATIONS

The present application is a continuation of International Patent Application No. PCT/CN2023/100603 filed Jun. 16, 2023, entitled "CIRCUIT FOR SUPPLYING POWER TO SWITCH POWER SOURCE CONTROL CIRCUIT ON BASIS OF AUXILIARY WINDING", which claims priority to Chinese Patent Application No. 202211200833.3, filed on Sep. 29, 2022 and entitled "CIRCUIT FOR SUPPLYING POWER TO SWITCHING POWER SUPPLY CONTROL CIRCUIT BASED ON AUXILIARY WINDING", the disclosures of which are hereby incorporated by reference in their entirety.

TECHNICAL FIELD

The present application relates to the technical field of switching power supplies, and in particular, to a circuit for supplying power to a switching power supply control circuit based on an auxiliary winding.

BACKGROUND OF THE INVENTION

In a technology for supplying power to a flyback switching power supply, flyback power supply with an auxiliary winding or forward power supply with the auxiliary winding is generally used to supply power to a control circuit in the flyback switching power supply. For a flyback switching power supply with a wide input voltage range (for example, a voltage of 50 V to 375 V) or a wide output voltage range (for example, a voltage of 3 V to 20 V), the voltage supplied to the control circuit by the flyback power supply may be as high as 70 V under a working condition of a high output voltage, and furthermore, the voltage supplied to the control circuit by the forward power supply may be also as high as 70 V under a working condition of a high input voltage. However, the supply voltage of the control circuit cannot exceed 60 V under normal circumstances, and when the supply voltage exceeds 60 V, an operating temperature of some components increases, which affects the service life and reliability. In addition, losses of the control circuit and a rectifying device in the flyback switching power supply increase, thereby affecting overall reliability of a system.

Currently, to reduce the voltage at a power supply terminal of the control circuit under a working condition of a wide input voltage range or a wide output voltage range, a means of flyback power supply with double auxiliary windings is generally used to reduce the supply voltage of the control circuit, or a boost circuit is added in addition to flyback power supply with a single auxiliary winding, to reduce the supply voltage of the control circuit. However, regardless of the means of using the double auxiliary windings and the means of adding the boost circuit, costs increase although the supply voltage of the control circuit can be reduced.

Therefore, it can be seen that it is an urgent problem to be solved by those skilled in the art how to effectively reduce the voltage at the power supply terminal of the control circuit of the switching power supply under a working condition of a wide input voltage range or a wide output voltage range, reduce a system loss, and further improve the reliability of the system while costs are controlled.

SUMMARY OF THE INVENTION

An objective of the present application is to provide a circuit for supplying power to a switching power supply control circuit based on an auxiliary winding, to combine forward power supply and flyback power supply to supply power to the control circuit, so as to reduce a supply voltage of the control circuit under a working condition of a wide input voltage range or a wide output voltage range, thereby effectively reducing a system loss.

To solve the above technical problem, the present application provides a circuit for supplying power to a switching power supply control circuit based on an auxiliary winding, including: an auxiliary winding, a switching transistor, a low dropout voltage regulator (LDO), a first diode, a second diode, a forward energy storage capacitor, and a flyback energy storage capacitor, where a common terminal generated by connecting one terminal of the forward energy storage capacitor to a cathode of the first diode is separately connected to an output terminal of the LDO and a power source terminal of the control circuit, the other terminal of the forward energy storage capacitor is grounded, a common terminal generated by connecting an anode of the first diode to one terminal of the flyback energy storage capacitor is connected to a heteronymous terminal of the auxiliary winding, a homonymous terminal of the auxiliary winding is grounded, a common terminal generated by connecting the other terminal of the flyback energy storage capacitor to an anode of the second diode is connected to one terminal of the switching transistor, the other terminal of the switching transistor is grounded, and a cathode of the second diode is connected to an input terminal of the LDO;

the auxiliary winding, the first diode, and the forward energy storage capacitor form a forward energy storage loop to charge the forward energy storage capacitor, and the auxiliary winding, the flyback energy storage capacitor, and the switching transistor form a flyback energy storage loop to charge and store energy for the flyback energy storage capacitor; and in a forward state, when the voltage of the forward energy storage capacitor is less than the voltage at the output terminal of the LDO, the flyback energy storage capacitor supplies power to the control circuit, or when the voltage of the forward energy storage capacitor is greater than the voltage at the output terminal of the LDO, the forward energy storage capacitor supplies power to the control circuit.

Preferably, the circuit for supplying power to a switching power supply control circuit based on an auxiliary winding further includes: a voltage stabilizing capacitor, where one terminal of the voltage stabilizing capacitor is connected to the input terminal of the LDO, and the other terminal thereof is grounded.

Preferably, the circuit for supplying power to a switching power supply control circuit based on an auxiliary winding further includes: a third diode, where an anode of the third diode is connected to the output terminal of the LDO, and a cathode thereof is connected to the power source terminal of the control circuit.

Preferably, when the switching transistor is a field-effect transistor, the circuit for supplying power to a switching power supply control circuit based on an auxiliary winding further includes:

one terminal of the field-effect transistor is connected to the other terminal of the flyback energy storage capacitor, the other terminal of the field-effect transistor is grounded, and a control terminal is connected to a zero voltage switching (ZVS) control terminal of the control circuit, so as to implement a ZVS of a switching power supply.

Preferably, the circuit for supplying power to a switching power supply control circuit based on an auxiliary winding further includes: a first resistor and a second resistor, where a common terminal generated by connecting the first resistor and the second resistor in series is connected to a voltage sampling terminal of a control chip, the other terminal of the second resistor is grounded, and the other terminal of the first resistor is connected to the heteronymous terminal of the auxiliary winding.

To solve the above technical problem, the present application further provides a switching power supply, including the circuit for supplying power to a switching power supply control circuit based on an auxiliary winding.

A circuit for supplying power to a switching power supply control circuit based on an auxiliary winding according to the present invention includes: an auxiliary winding, a switching transistor, an LDO, a first diode, a second diode, a forward energy storage capacitor, and a flyback energy storage capacitor, where the auxiliary winding, the flyback energy storage capacitor, and the switching transistor form a flyback energy storage loop to charge and store energy for the flyback energy storage capacitor, and the auxiliary winding, the flyback energy storage capacitor, and the switching transistor form a flyback energy storage loop to charge and store energy for the flyback energy storage capacitor. During power supply to the control circuit in a forward state, if the voltage of the forward energy storage capacitor is less than the voltage at an output terminal of the LDO, the flyback energy storage capacitor supplies power to the control circuit, or if the voltage of the forward energy storage capacitor is greater than the voltage at the output terminal of the LDO, the forward energy storage capacitor supplies power to the control circuit. Thus, in the technical solution provided in the present application, according to the current voltage of the forward energy storage capacitor, forward energy storage and flyback energy storage are combined to supply power to the control circuit, and the voltage at a power source terminal of the control circuit is effectively reduced due to voltage stabilizing characteristics of the LDO.

In addition, the present application further provides a switching power supply, which corresponds to the above-mentioned circuit for supplying power to a switching power supply control circuit based on an auxiliary winding, and has the same effects as above.

BRIEF DESCRIPTION OF THE DRAWINGS

In order to more clearly describe the embodiments of the present application, accompanying drawings to be used in the embodiments are briefly introduced below. Obviously, the accompanying drawings in the following description are merely some of the embodiments of the present application. Those of ordinary skill in the art can further obtain other accompanying drawings according to these accompanying drawings without involving inventive skill.

DETAILED DESCRIPTION OF THE INVENTION

Figure 1:
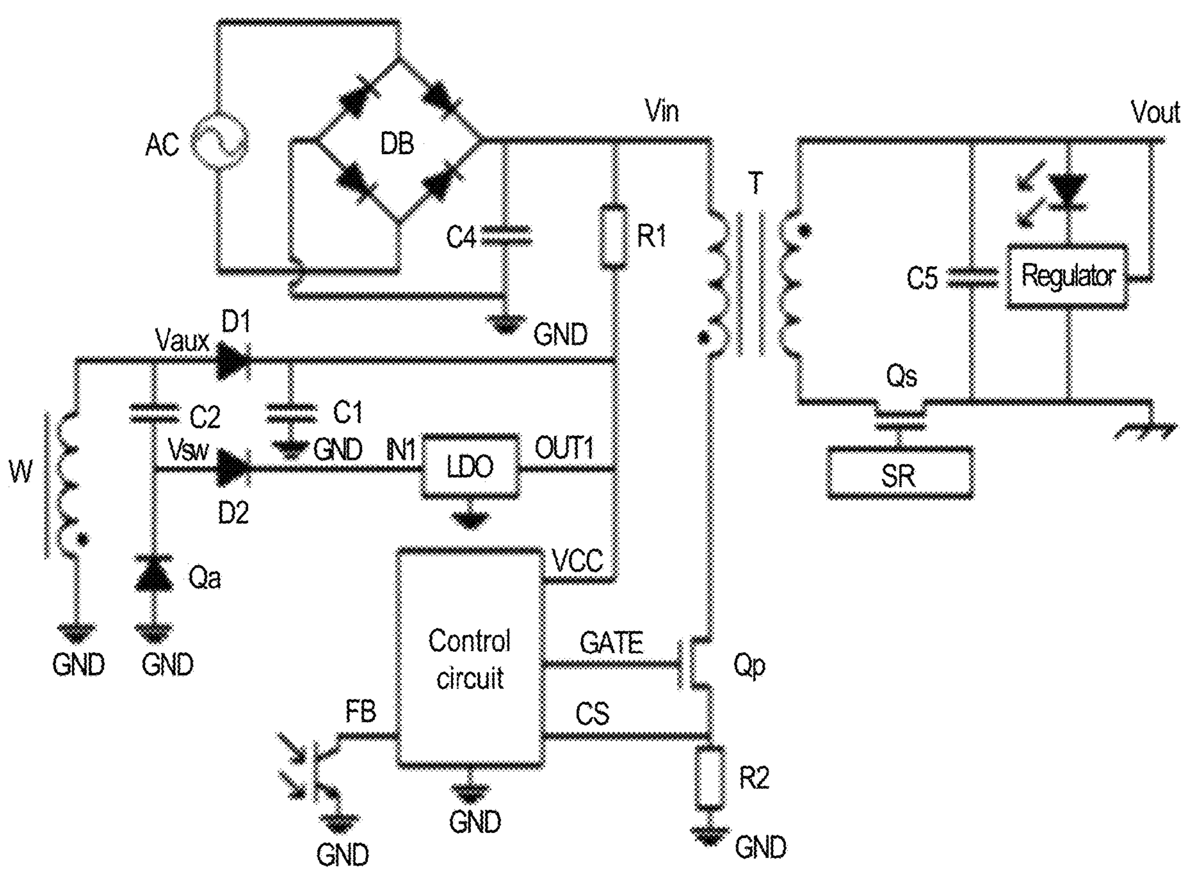
FIG. 1 is a schematic diagram of a circuit for supplying power to a switching power supply control circuit based on an auxiliary winding according to one embodiment of the present application.

The technical solutions in the embodiments of the present application are clearly and completely described below with reference to the accompanying drawings in the embodiments of the present application. It is apparent that the described embodiments are merely some, rather than all, of the embodiments of the present application. On the basis of the embodiments in the present application, all other embodiments obtained by those of ordinary skill in the art without involving inventive skill fall within the scope of protection of the present application.

The core of the present application is to provide a circuit for supplying power to a switching power supply control circuit based on an auxiliary winding, to supply power to the control circuit by a forward energy storage capacitor or a flyback energy storage capacitor according to a magnitude relationship between the voltage of the forward energy storage capacitor and the voltage at an output terminal of a low dropout voltage regulator (LDO) during power supply to the control circuit, that is, to combine forward power supply and flyback power supply to supply power to the control circuit, so as to reduce the voltage at a power supply terminal of the control circuit under a special working condition, thereby effectively reducing a system loss.

In order to enable those in the art to better understand the solution of the present application, the present application is described in further detail below with reference to the accompanying drawings and detailed description of the embodiments.

In a technology for supplying power to a flyback switching power supply, flyback power supply with an auxiliary winding or forward power supply with the auxiliary winding is generally used to supply power to a control circuit in the flyback switching power supply. For a flyback switching power supply with a wide input voltage range (for example, a voltage of 50 V to 375 V) or a wide output voltage range (for example, a voltage of 3 V to 20 V), the voltage supplied to the control circuit by the flyback power supply may be as high as 70 V under a working condition of a high output voltage, and furthermore, the voltage supplied to the control circuit by the forward power supply may be also as high as 70 V under a working condition of a high input voltage. However, the supply voltage of the control circuit cannot exceed 60 V under normal circumstances, and when the supply voltage exceeds 60 V, an operating temperature of some components increases, which affects the service life and reliability. In addition, losses of the control circuit and a rectifying device in the flyback switching power supply increase, thereby affecting overall reliability of a system.

Currently, to reduce the voltage at a power supply terminal of the control circuit under a working condition of a wide input voltage range or a wide output voltage range, a means of flyback power supply with double auxiliary windings is generally used to reduce the supply voltage of the control circuit, or a boost circuit is added in addition to flyback power supply with a single auxiliary winding, to reduce the supply voltage of the control circuit. However, regardless of the means of using the double auxiliary windings and the means of adding the boost circuit, costs increase although the supply voltage of the control circuit can be reduced.

To effectively reduce the voltage at the power supply terminal of the control circuit of the switching power supply under a working condition of a wide input voltage range or a wide output voltage range and reduce the system loss while costs are controlled, the present application provides a circuit for supplying power to a switching power supply control circuit based on an auxiliary winding, to combine forward power supply, flyback power supply, and properties of the LDO to supply power to the control circuit during power supply to the control circuit, thereby effectively reducing the voltage at the power supply terminal of the control circuit under the working condition of the wide input voltage range or the wide output voltage range.

FIG. 1 is a schematic diagram of a circuit for supplying power to a switching power supply control circuit based on an auxiliary winding according to the present application. As shown in FIG. 1, the circuit includes: an auxiliary winding W, a switching transistor Qa, an LDO, a first diode D1, a second diode D2, a forward energy storage capacitor C1, and a flyback energy storage capacitor C2.

A common terminal generated by connecting one terminal of the forward energy storage capacitor C1 to a cathode of the first diode D1 is connected to an output terminal OUT1 of the LDO and a power source terminal VCC of the control circuit, the other terminal of the forward energy storage capacitor C1 is grounded, a common terminal generated by connecting an anode of the first diode D1 to one terminal of the flyback energy storage capacitor C2 is connected to a heteronymous terminal of the auxiliary winding W, a homonymous terminal of the auxiliary winding W is grounded, a common terminal generated by connecting the other terminal of the flyback energy storage capacitor C2 to an anode of the second diode D2 is connected to one terminal of the switching transistor Qa, the other terminal of the switching transistor Qa is grounded, and a cathode of the second diode D2 is connected to an input terminal IN1 of the LDO.

In implementation, in a switching power supply, when a power switch Qp that is coupled to a homonymous terminal of a primary winding of a transformer T and is controlled by the control circuit is open, a power supply circuit of the control circuit is in a flyback state. In this case, the auxiliary winding W, the flyback energy storage capacitor C2, and the switching transistor Qa form a flyback energy storage loop, and a current flows from the grounded terminal of the switching transistor Qa to the flyback energy storage capacitor C2 through the switching transistor Qa, and flows from the flyback energy storage capacitor C2 to the auxiliary winding W and then to the grounded terminal to form a flyback energy storage loop to charge and store energy for the flyback energy storage capacitor C2.

When the power switch Qp is closed, the power supply circuit is in a forward state. In this case, the auxiliary winding W, the first diode D1, and the forward energy storage capacitor C1 form a forward energy storage loop, and a current flows from the grounded terminal of the auxiliary winding W to the first diode D1 through the auxiliary winding W, and flows from the first diode D1 to the forward energy storage capacitor C1 and then to the grounded terminal, thus forming a forward energy storage loop to charge and store energy for the forward energy storage capacitor C1.

When the power switch Qp is closed and the power supply circuit is in a forward state to supply power to the control circuit, if the voltage of the forward energy storage capacitor C1 is less than the voltage at the output terminal OUT1 of the LDO, electric energy stored in the flyback energy storage capacitor C2 in a flyback state is supplied to the control circuit, or if the voltage of the forward energy storage capacitor C1 is greater than the voltage at the output terminal OUT1 of the LDO, the forward energy storage capacitor C1 supplies power to the control circuit.

It can be understood that a low dropout regulator (LDO) is configured to stabilize the voltage. Therefore, when the input voltage at the input terminal IN1 of the LDO is greater than a stabilized voltage of the LDO, the LDO outputs the stabilized voltage. As shown in FIG. 1, it should be noted that a voltage Vaux at the anode of the first diode D1 needs to be greater than the voltage at the cathode thereof to ensure that the first diode D1 can be turned on. Similarly, a voltage Vsw at the anode of the second diode D2 needs to be greater than the voltage at the cathode thereof before the second diode D2 can be turned on. When a diode is turned on, because there is a voltage drop in the diode, the voltage at a cathode is equal to the voltage at an anode minus the voltage drop.

In implementation, as shown in FIG. 1, the voltage at the anode of the first diode D1 is Vaux=Vin*Naux/Np, where Vin is an input voltage of the switching power supply, Naux is a number of turns of the auxiliary winding, and Np is a number of turns of the primary winding of the transformer T. The voltage at the anode of the second diode D2 is Vsw=Vaux+Vout*Naux/Ns, where Vout is an output voltage of the switching power supply, and Ns is a number of turns of a secondary winding of the transformer T. The voltage across the flyback energy storage capacitor C2 is Vc2=Vsw−Vaux. Therefore, the voltage Vsw at the anode of the second diode D2 is also equal to the sum of the voltage across the flyback energy storage capacitor C2 and the voltage at the anode of the first diode D1, that is, Vsw=Vc2+Vaux.

In addition, it should be further noted that if the voltage at a common node connected to the first diode D1 and the forward energy storage capacitor C1 is different from the voltage at the output terminal OUT1 of the LDO, the control circuit is powered by a larger voltage. Therefore, according to the magnitude relationship between the voltage of the forward energy storage capacitor C1 and the voltage at the output terminal OUT1 of the LDO, and the properties of the LDO, the supply voltage of the control circuit under a working condition of a wide input voltage range or a wide output voltage range can be effectively reduced, that is, the voltage at the terminal VCC of the control circuit can be effectively reduced by combining forward power supply with flyback power supply. To facilitate understanding, examples will be given below.

Figure 2:
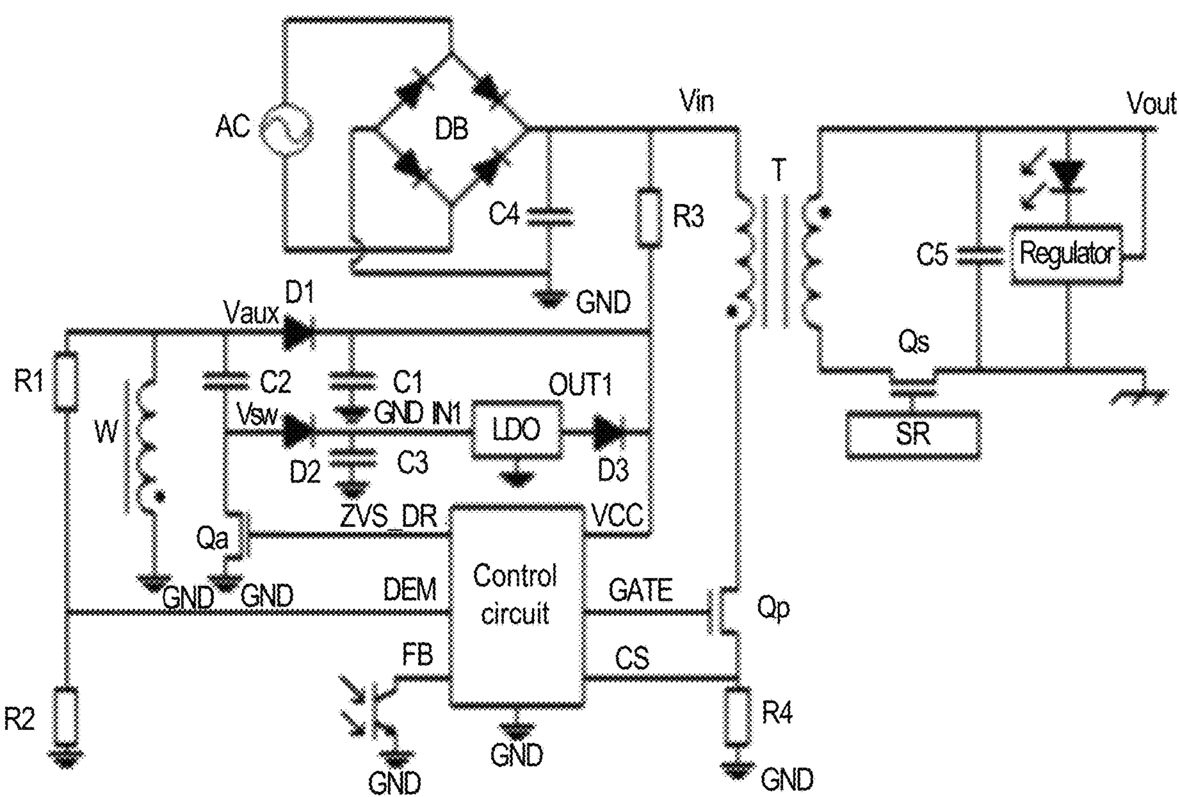
FIG. 2 is a schematic diagram of a circuit for supplying power to a switching power supply control circuit based on an auxiliary winding according to another embodiment of the present application.

When the power switch Qp is closed and the power supply circuit is in a forward state, it is assumed that Vaux=7 V, the voltage across the flyback energy storage capacitor C2 is Vc2=20 V, voltage drops of the first diode D1 and the second diode D2 are Vx=1 V, and a stabilized voltage of the LDO is Vy=15 V. In this case, Vc1=Vaux−Vx=6 V, Vsw=Vc2+Vaux=20+7=27 V, the voltage at the input terminal IN1 of the LDO is Vin1=Vsw−Vx=27 V−1 V=26 V, and the voltage at the output terminal OUT1 of the LDO is Vout1=15 V. As shown in FIG. 2, it can be seen that the forward energy storage capacitor C1 and the output terminal of the LDO are at the same node. In this case, Vc1<Vout1, and the power supply to VCC is based on a larger one of the voltage at the output terminal of the LDO and the voltage of the forward energy storage capacitor C1, so Vout1=15 V is used to supply power to the control circuit, that is, VCC=Vout1=15 V. It can be understood that in this case, the electric energy passing through the LDO is electric energy used when the flyback energy storage loop charges the flyback energy storage capacitor C2 in a flyback state, that is, the control circuit is powered by flyback power supply.

If Vaux=20 V, Vc2=20 V, Vx=1 V, and the stabilized voltage of the LDO is Vy=15 V, Vc1=Vaux−Vx=19 V, Vsw=Vc2+Vaux=40 V, the voltage at the input terminal IN1 of the LDO is Vin1=Vsw−Vx=40 V−1 V=39 V, and due to the voltage stabilization property of the LDO, the voltage at the output terminal OUT1 of the LDO is Vout1=15 V. In this case, Vc1>Vout1, so Vc1=19 V is used to supply power to the control circuit, that is, VCC=Vc1=19 V. It can be understood that in this case, the electric energy used when the forward energy storage loop charges the forward energy storage capacitor C1 is used to supply power to the control circuit, that is, the control circuit is powered by forward power supply.

To sum up, it can be concluded that if Vaux−Vx>Vy, VCC=Vaux−Vx, or if Vaux−Vx<Vy and Vsw−Vx>Vy, VCC=Vy, or if Vaux−Vx<Vy and Vsw−Vx<Vy, VCC=Vsw−Vx, where Vy is the stabilized voltage of the LDO.

Therefore, when Vaux is high, forward power supply is performed, or when Vaux is small, flyback power supply is performed. Therefore, in the technical solution provided in the present application, the forward power supply and the flyback power supply are combined to supply power to the control circuit, so as to prevent, during wide-range input or wide-range output, the supply voltage of the control circuit from exceeding the maximum voltage that can be withstood, which otherwise leads to an increase in an operating temperature of some components, affects the service life of the components, and further affects the reliability of the system.

A circuit for supplying power to a switching power supply control circuit based on an auxiliary winding according to an embodiment of the present application includes: an auxiliary winding, a switching transistor, an LDO, a first diode, a second diode, a forward energy storage capacitor, and a flyback energy storage capacitor, where the auxiliary winding, the flyback energy storage capacitor, and the switching transistor form a flyback energy storage loop to charge and store energy for the flyback energy storage capacitor, and the auxiliary winding, the flyback energy storage capacitor, and the switching transistor form a flyback energy storage loop to charge and store energy for the flyback energy storage capacitor. During power supply to the control circuit in a forward state, if the voltage of the forward energy storage capacitor is less than the voltage at an output terminal of the LDO, the flyback energy storage capacitor supplies power to the control circuit, or if the voltage of the forward energy storage capacitor is greater than the voltage at the output terminal of the LDO, the forward energy storage capacitor supplies power to the control circuit. Thus, in the technical solution provided in the present application, according to the current voltage of the forward energy storage capacitor, forward energy storage and flyback energy storage are combined to supply power to the control circuit, and the voltage at a power source terminal of the control circuit is effectively reduced due to voltage stabilizing characteristics of the LDO.

FIG. 2 is a schematic diagram of a circuit for supplying power to a switching power supply control circuit based on an auxiliary winding according to another embodiment of the present application. Based on the above embodiment, to prevent jitter of the voltage at the input terminal of the LDO, the circuit for supplying power to a switching power supply control circuit based on an auxiliary winding according to the embodiment of the present application further includes a voltage stabilizing capacitor C3. As shown in FIG. 2, one terminal of the voltage stabilizing capacitor C3 is connected to the input terminal IN1 of the LDO, and the other terminal thereof is grounded.

In implementation, if the second diode D2 is an ideal diode, the second diode D2 generates no parasitic capacitance during use, so the voltage passing through the output terminal of the LDO is a stabilized voltage. However, in practical application, the second diode D2 cannot reach an ideal state, and usually generates parasitic capacitance, which causes Vsw to fluctuate, and then leads to a fluctuation of the voltage at the input terminal of the LDO. When the voltage at the input terminal of the LDO fluctuates to a negative voltage, the LDO may be damaged.

Therefore, to prevent the damage of the LDO and improve overall reliability of the system, the voltage stabilizing capacitor C3 is additionally provided between the second diode D2 and the LDO in the circuit for supplying power to a switching power supply control circuit based on an auxiliary winding according to the present application.

After the voltage stabilizing capacitor C3 is additionally provided, when the power switch Qp is closed, in addition to the formation of a forward energy storage loop by the auxiliary winding W, the first diode D1, and the forward energy storage capacitor C1, the auxiliary winding W, the flyback energy storage capacitor C2, the second diode D2, and the voltage stabilizing capacitor C3 also form a forward energy storage loop. A current flows from the grounded terminal of the auxiliary winding W to the flyback energy storage capacitor C2 through the auxiliary winding W, and then flows through the second diode D2 to the voltage stabilizing capacitor C3 to charge and store energy for the voltage stabilizing capacitor C3. That is, in the forward state, forward energy storage involves two energy storage loops, which charge the forward energy storage capacitor C1 and the voltage stabilizing capacitor C3, respectively.

In the circuit for supplying power to a switching power supply control circuit based on an auxiliary winding according to the embodiment of the present application, the voltage stabilizing capacitor is additionally provided between the second diode and the LDO, to prevent damage to the LDO caused by jitter of the voltage at the input terminal of the LDO, further reduce a system loss and improve reliability.

Based on the above embodiment, to prevent reverse conduction between the input terminal of the LDO and the terminal VCC of the control circuit, the circuit for supplying power to a switching power supply control circuit based on an auxiliary winding according to the present application further includes a third diode D3. As shown in FIG. 2, an anode of the third diode D3 is connected to the output terminal OUT1 of the LDO, and a cathode thereof is connected to the power source terminal VCC of the control circuit.

In the circuit for supplying power to a switching power supply control circuit based on an auxiliary winding according to the embodiment of the present application, a diode is additionally provided between the output terminal of the LDO and the power supply terminal of the control circuit to prevent reverse conduction between the input terminal of the LDO and the terminal VCC of the control circuit, and further improve the reliability of the switching power supply.

In specific implementation, the switching transistor Qa may be a diode or a field-effect transistor, which is not limited in the present application. When the switching transistor Qa is a field-effect transistor, as shown in FIG. 2, one terminal of the field-effect transistor Qa is connected to the other terminal of the flyback energy storage capacitor C2, the other terminal of the field-effect transistor Qa is grounded, and a control terminal is connected to a control terminal ZVS-DR of the control circuit.

Before the power switch Qp is closed, the control circuit generates a ZVS control signal according to the voltage at a point Vaux, and controls the field-effect transistor Qa to be turned on by the control terminal ZVS-DR, so that a resonant current is formed between the auxiliary winding W, the flyback energy storage capacitor C2, and the switching transistor Qa. The resonant current affects the voltage of the power switch Qp to generate downward resonance. In addition, magnetic coupling between the auxiliary winding W and the transformer T implements reversal of an excitation current of the primary winding, to pump back junction capacitance charges of the primary power switch Qp, so that a voltage Vds of the primary power switch is reduced to zero, and the ZVS of the primary power switch Qp is implemented, thereby effectively improving the efficiency of the switching power supply.

In the circuit for supplying power to a switching power supply control circuit based on an auxiliary winding according to the embodiment of the present application, the switching transistor is provided as a field-effect transistor, the control terminal of the field-effect transistor is connected to the ZVS control terminal of the control circuit, and then the ZVS of the switching power supply is implemented, thereby improving operating efficiency of the system and further improving the reliability of the system.

In a preferred embodiment, as shown in FIG. 2, the circuit for supplying power to a switching power supply control circuit based on an auxiliary winding according to the present application further includes a first resistor R1 and a second resistor R2. A common terminal generated by connecting the first resistor R1 and the second resistor R2 in series is connected to a voltage sampling terminal DEM of a control chip, the other terminal of the second resistor R2 is grounded, and the other terminal of the first resistor R1 is connected to the heteronymous terminal of the auxiliary winding W. The first resistor R1 and the second resistor R2 implement voltage-divided sampling of Vaux, and then generate a ZVS control signal.

In the circuit for supplying power to a switching power supply control circuit based on an auxiliary winding according to the embodiment of the present application, the first resistor and the second resistor are additionally provided, the common terminal generated by connecting the first resistor and the second resistor in series is connected to the voltage sampling terminal of the control chip, the other terminal of the second resistor is grounded, and the other terminal of the first resistor is connected to the heteronymous terminal of the auxiliary winding. Therefore, the first resistor and the second resistor implement voltage-divided sampling of the heteronymous terminal of the auxiliary winding, so as to generate a ZVS control signal of the switching power supply, further implement the ZVS of the switching power supply and improve the operating efficiency of the system.

The circuit for supplying power to a switching power supply control circuit based on an auxiliary winding is described in detail in the above embodiments. An embodiment of the present application further provides a switching power supply, including the circuit for supplying power to a switching power supply control circuit based on an auxiliary winding in the above embodiments, and the generated beneficial effects correspond to those of the circuit for supplying power to a switching power supply control circuit based on an auxiliary winding in the above embodiments. The effects are the same as above, and details are not repeated herein.

The circuit for supplying power to a switching power supply control circuit based on an auxiliary winding according to the present application is described in detail above. The embodiments in the specification are described in a progressive manner. Each of the embodiments focuses on differences from other embodiments, and for identical or similar parts between the embodiments, reference may be made to each other. The apparatus disclosed in the embodiments is described briefly because the apparatus corresponds to the method disclosed in the embodiments, and for related parts, reference may be made to the description of the method. It should be noted that those of ordinary skill in the art can further make several improvements and modifications to the present application without departing from the principle of the present application, and the improvements and modifications also fall within the scope of protection of the claims of the present application.

It should also be noted that in the present specification, relational terms such as first, second, etc., are merely used to distinguish an entity or operation from another entity or operation, and it is not necessarily required or implicated that any such actual relationship or order is present between these entities or operations. In addition, the term "include," "comprise," or any other variation thereof is intended to encompass a non-exclusive inclusion, so that a process, method, article, or device that includes a series of elements includes not only those elements but also other elements not explicitly listed, or elements that are inherent to such a process, method, article, or device. The element defined by the statement "including one . . . ", when without further limitation, does not preclude the presence of additional identical elements in the process, method, article, or device that includes the element.

What is claimed is:

1. A circuit for supplying power to a switching power supply control circuit based on an auxiliary winding, the circuit comprising:

an auxiliary winding;

a switching transistor;

a low dropout voltage regulator (LDO);

a first diode;

a second diode;

a forward energy storage capacitor; and a flyback energy storage capacitor, wherein:

a common terminal generated by connecting a first terminal of the forward energy storage capacitor to a cathode of the first diode is separately connected to an output terminal of the LDO and a power source terminal of the switching power supply control circuit;

a second terminal of the forward energy storage capacitor is grounded, and a common terminal generated by connecting an anode of the first diode to a third terminal of the flyback energy storage capacitor is connected to a heteronymous terminal of the auxiliary winding, a homonymous terminal of the auxiliary winding is grounded, and a common terminal generated by connecting a fourth terminal of the flyback energy storage capacitor to an anode of the second diode is connected to a fifth terminal of the switching transistor, a sixth terminal of the switching transistor is grounded, and a cathode of the second diode is connected to an input terminal of the LDO;

the auxiliary winding, the first diode, and the forward energy storage capacitor form a forward energy storage loop to charge the forward energy storage capacitor, and the auxiliary winding, the flyback energy storage capacitor, and the switching transistor form a flyback energy storage loop to charge and store energy for the flyback energy storage capacitor; and in a forward state, when a voltage of the forward energy storage capacitor is less than a voltage at the output terminal of the LDO, the flyback energy storage capacitor supplies power to the switching power supply control circuit, or when the voltage of the forward energy storage capacitor is greater than the voltage at the output terminal of the LDO, the forward energy storage capacitor supplies power to the switching power supply control circuit.

2. The circuit for supplying power to the switching power supply control circuit based on an auxiliary winding according to claim 1, further comprises: a voltage stabilizing capacitor, wherein a seventh terminal of the voltage stabilizing capacitor is connected to the input terminal of the LDO, and an eighth terminal thereof is grounded.

3. The circuit for supplying power to the switching power supply control circuit based on an auxiliary winding according to claim 2, further comprises: a third diode, wherein an anode of the third diode is connected to the output terminal of the LDO, and a cathode thereof is connected to the power source terminal of the switching power supply control circuit.

4. The circuit for supplying power to the switching power supply control circuit based on an auxiliary winding according to claim 1, wherein the switching transistor comprises a field-effect transistor, and wherein a ninth terminal of the field-effect transistor is connected to the fourth terminal of the flyback energy storage capacitor, a tenth terminal of the field-effect transistor is grounded, and a control terminal is connected to a zero voltage switching (ZVS) control terminal of the switching power supply control circuit, so as to implement a ZVS of the switching power supply control circuit.

5. The circuit for supplying power to the switching power supply control circuit based on an auxiliary winding according to claim 4, further comprises: a first resistor and a second resistor, wherein a common terminal generated by connecting a eleventh terminal of the first resistor and a thirteenth terminal of the second resistor in series is connected to a voltage sampling terminal of a control chip, a twelfth terminal of the second resistor is grounded, and a fourteenth terminal of the first resistor is connected to the heteronymous terminal of the auxiliary winding.

6. A switching power supply comprising:

a circuit for supplying power to a switching power supply control circuit based on an auxiliary winding, wherein the circuit comprises an auxiliary winding, a switching transistor, a low dropout voltage regulator (LDO), a first diode, a second diode, a forward energy storage capacitor, and a flyback energy storage capacitor, wherein:

a common terminal generated by connecting a first terminal of the forward energy storage capacitor to a cathode of the first diode is separately connected to an output terminal of the LDO and a power source terminal of the switching power supply control circuit, a second terminal of the forward energy storage capacitor is grounded, and a common terminal generated by connecting an anode of the first diode to a third terminal of the flyback energy storage capacitor is connected to a heteronymous terminal of the auxiliary winding, a homonymous terminal of the auxiliary winding is grounded, and a common terminal generated by connecting a fourth terminal of the flyback energy storage capacitor to an anode of the second diode is connected to a fifth terminal of the switching transistor, a sixth terminal of the switching transistor is grounded, and a cathode of the second diode is connected to an input terminal of the LDO;

the auxiliary winding, the first diode, and the forward energy storage capacitor form a forward energy storage loop to charge the forward energy storage capacitor, and the auxiliary winding, the flyback energy storage capacitor, and the switching transistor form a flyback energy storage loop to charge and store energy for the flyback energy storage capacitor; and in a forward state, when a voltage of the forward energy storage capacitor is less than a voltage at the output terminal of the LDO, the flyback energy storage capacitor supplies power to the switching power supply control circuit, or when the voltage of the forward energy storage capacitor is greater than the voltage at the output terminal of the LDO, the forward energy storage capacitor supplies power to the switching power supply control circuit.

7. The switching power supply according to claim 6, further comprises: a voltage stabilizing capacitor, wherein a seventh terminal of the voltage stabilizing capacitor is connected to the input terminal of the LDO, and an eighth terminal thereof is grounded.

8. The switching power supply according to claim 7, further comprises: a third diode, wherein an anode of the third diode is connected to the output terminal of the LDO, and a cathode thereof is connected to the power source terminal of the switching power supply control circuit.

9. The switching power supply according to claim 6, wherein when the switching transistor comprises a field-effect transistor and a ninth terminal of the field-effect transistor is connected to the second terminal of the flyback energy storage capacitor, a tenth terminal of the field-effect transistor is grounded, and a control terminal is connected to a zero voltage switching (ZVS) control terminal of the switching power supply control circuit, so as to implement a ZVS of the switching power supply control circuit.

10. The switching power supply according to claim 9, further comprises: a first resistor and a second resistor, wherein a common terminal generated by connecting an eleventh terminal of the first resistor and a thirteenth terminal of the second resistor in series is connected to a voltage sampling terminal of a control chip, a twelfth terminal of the second resistor is grounded, and a fourteenth terminal of the first resistor is connected to the heteronymous terminal of the auxiliary winding.

* * * * *